Figures 1, 2, 3:
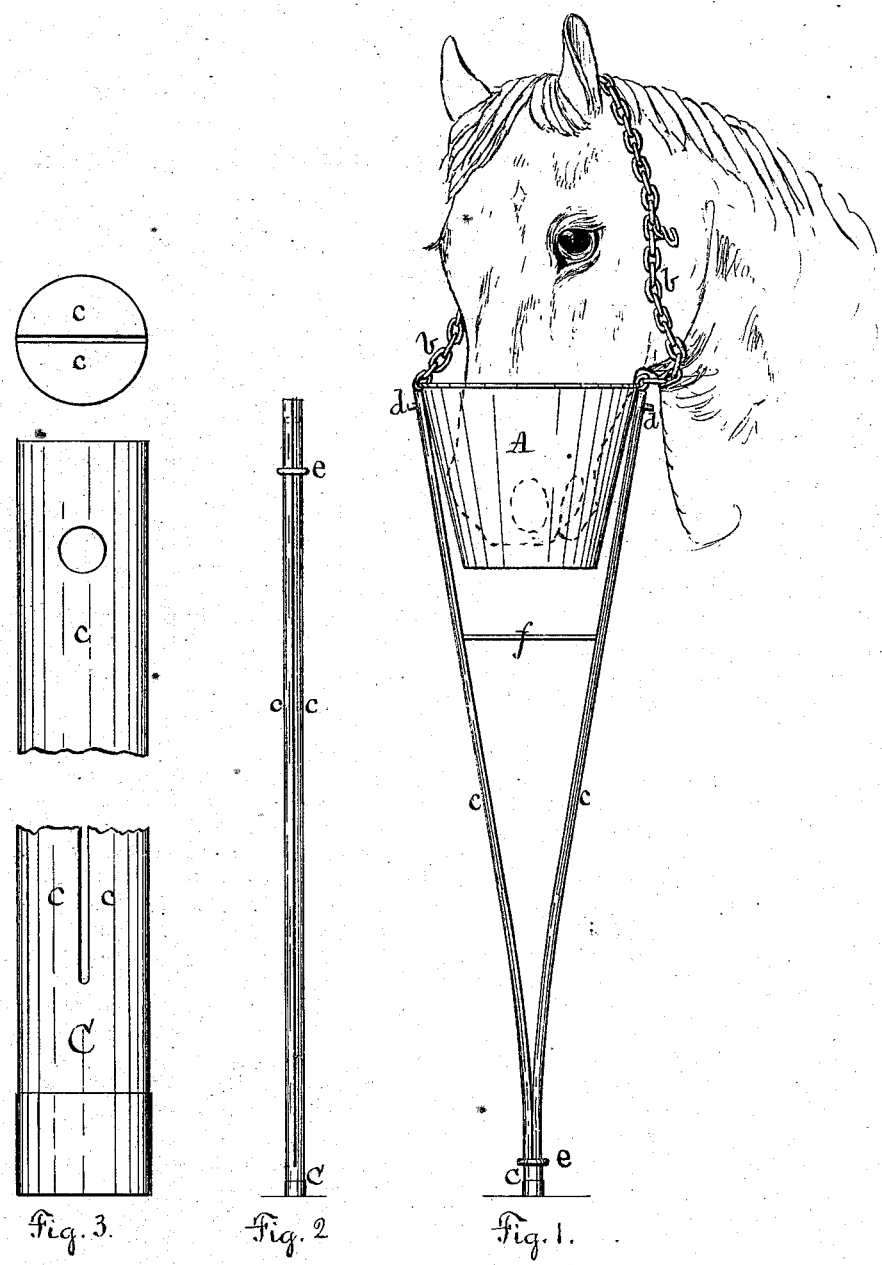

A. H. SPENCER.
Portable Horse-Feeding Support.

No. 159,617. Patented Feb. 9, 1875.

Witnesses.
Chas. F. Sleeper.
Wm. H. Emmons.

Inventor.
Albert H. Spencer

UNITED STATES PATENT OFFICE.

ALBERT H. SPENCER, OF BOSTON, MASSACHUSETTS.

IMPROVEMENT IN PORTABLE HORSE-FEEDING SUPPORTS.

Specification forming part of Letters Patent No. 159,617, dated February 9, 1875; application filed January 11, 1875.

*To all whom it may concern:*

Be it known that I, ALBERT H. SPENCER, of Boston, State of Massachusetts, have invented an Improvement in Feed-Buckets for Animals, of which the following is a specification:

The object of my invention is to relieve the animal's neck of the weight of the food while eating, to enable him, without effort, to reach all the grain in the bucket, and thus prevent waste.

In the drawings, A represents the bucket or bag for containing the food, with a chain, b, attached to it at each side, passing over the animal's head, to prevent his removing it entirely from the bucket. I prefer a conical form for these pails, as conforming more nearly to the shape of a horse's head, packing more snugly for storage or transportation, and being better adapted for attaching the support in the simplest manner. C represents the portable rest or support, which may be made in various ways; but the method shown in the drawings is the simplest and best.

A wooden staff of suitable size, protected by a stout ferrule at the bottom to rest on the ground, is split nearly its entire length and parted at the top, so as to receive the pail A between the ends. A socket at each of these ends, c c, receives a pin or hook, d d, projecting from each side of the pail near the top, by which means the support is attached to it and suspended from it.

If preferred, the hooks may belong to the support and the sockets to the pail. The relative arrangement of these parts is such that the bucket is always supported in an upright position, the center of gravity being below the pins which connect it with the forked standard; and in case the bucket is raised above its proper height and tipped to the front or rear the standard will, by its own weight, maintain a perpendicular position, and be ready to act when sufficiently lowered. A brace, f, between the prongs of the support below the bucket, adds to its strength or stiffness, as shown in Figure 1.

When the animal has eaten his grain the support can be readily removed by springing it off from the pins d d. The bucket is then adapted for use as a water-pail or for other purposes; and by sliding the ring e up toward the top of the standard the prongs c c are brought and held in close contact with each other, as shown in Fig. 2.

Instead of the customary strap over the animal's head, I use a chain, b, which will lie snug in its place, even if very slack, when eating from the bottom of the pail, thus avoiding a tendency to slip over the ears and fall off, as a stiff strap would do. This plan has also the merit of cheapness, and does not hurt the horse, as the weight of the bucket and contents rests on the support C. A simple hook at either side enables me to shorten the chain at pleasure.

The support may be made of a single piece bent into U form, or of two pieces hinged together at the bottom; but I prefer the form shown in the drawings, Fig. 3 showing details of full diameter for illustration.

I claim as my invention—

1. A feed-bucket adapted to be suspended from the animal's neck, and trunnioned near its upper part to a bifurcated support, substantially as and for the purpose described.

2. The detachable support C c c, constructed as and for the purpose specified.

ALBERT H. SPENCER.

Witnesses:
J. R. WIDGER,
S. A. SNOW.